United States Patent
Hung et al.

(10) Patent No.: US 12,513,000 B2
(45) Date of Patent: Dec. 30, 2025

(54) APPARATUS AND METHOD FOR PERFORMING AUTHENTICATED ENCRYPTION WITH ASSOCIATED DATA OPERATION OF ENCRYPTED INSTRUCTION WITH CORRESPONDING GOLDEN TAG STORED IN MEMORY DEVICE IN EVENT OF CACHE MISS

(71) Applicant: PUFsecurity Corporation, Hsinchu County (TW)

(72) Inventors: Tsung-Wei Hung, Hsinchu County (TW); Chia-Cho Wu, Hsinchu County (TW); Wen-Ching Lin, Hsinchu County (TW)

(73) Assignee: PUFsecurity Corporation, Hsinchu County (TW)

( * ) Notice: Subject to any disclaimer, the term of this patent is extended or adjusted under 35 U.S.C. 154(b) by 218 days.

(21) Appl. No.: 18/372,694

(22) Filed: Sep. 25, 2023

(65) Prior Publication Data

US 2024/0179009 A1    May 30, 2024

Related U.S. Application Data (60) Provisional application No. 63/428,425, filed on Nov. 29, 2022.

(51) Int. Cl.
*H04L 9/32* (2006.01)
*H04L 9/08* (2006.01)

(52) U.S. Cl.
CPC .......... *H04L 9/3242* (2013.01); *H04L 9/0861* (2013.01)

(58) Field of Classification Search
CPC ............................ H04L 9/3242; H04L 9/0861
See application file for complete search history.

(56) References Cited

U.S. PATENT DOCUMENTS

| | | | |
|---|---|---|---|
| 9,165,143 B1 * | 10/2015 | Sanders | G06F 21/575 |
| 9,577,822 B1 * | 2/2017 | Pedersen | G06F 21/30 |
| RE48,716 E * | 8/2021 | Ma | G06F 21/85 |
| 2004/0034823 A1 * | 2/2004 | Watkins | G06F 21/52 |
| | | | 714/724 |
| 2011/0307713 A1 * | 12/2011 | Goto | G06F 21/72 |
| | | | 713/189 |

(Continued)

FOREIGN PATENT DOCUMENTS

TW     201918925 A     5/2019

*Primary Examiner* — Darshan I Dhruv
(74) *Attorney, Agent, or Firm* — Winston Hsu (57) ABSTRACT

An apparatus and a method for performing an authenticated encryption with associated data (AEAD) operation of an encrypted instruction and a golden tag stored in a memory device in an event of a cache miss are provided. The apparatus includes a bus control circuit, a block buffer, a tag buffer and an AEAD circuit. The bus control circuit receives a read address from a cache for reading the encrypted instruction and the golden tag from the memory device. The block buffer receives and stores the encrypted instruction from the bus control circuit, wherein a size of the block buffer is preset to be N times a size of one cache line. The tag buffer receives and stores the golden tag from the bus control circuit. The AEAD circuit performs the AEAD operation upon the encrypted instruction and the golden tag to check whether the encrypted instruction is tampered or not.

11 Claims, 9 Drawing Sheets

(56) References Cited

U.S. PATENT DOCUMENTS

| | | | |
|---|---|---|---|
| 2014/0281587 A1* | 9/2014 | Ignatchenko | G06F 21/64 |
| | | | 713/193 |
| 2014/0325238 A1 | 10/2014 | Ghose | |
| 2017/0026171 A1* | 1/2017 | Lal | H04L 9/0822 |
| 2017/0329995 A1* | 11/2017 | Benoit | G06F 21/64 |
| 2018/0081825 A1 | 3/2018 | Aschauer | |
| 2019/0042799 A1* | 2/2019 | Durham | G06F 21/64 |
| 2019/0122007 A1* | 4/2019 | Van Antwerpen | G06F 21/602 |
| 2020/0265169 A1* | 8/2020 | Goto | G06F 13/24 |
| 2021/0349634 A1* | 11/2021 | Durham | G06F 3/062 |
| 2022/0043654 A1 | 2/2022 | DeHon | |
| 2022/0103369 A1* | 3/2022 | Adams | H04L 9/3234 |
| 2022/0156411 A1* | 5/2022 | Benoit | G06F 21/79 |
| 2022/0171887 A1* | 6/2022 | Chritz | H04L 9/3242 |
| 2022/0222337 A1 | 7/2022 | Doshi | |
| 2023/0114689 A1* | 4/2023 | Knezevic | H04L 9/0631 |
| | | | 380/28 |

* cited by examiner

APPARATUS AND METHOD FOR PERFORMING AUTHENTICATED ENCRYPTION WITH ASSOCIATED DATA OPERATION OF ENCRYPTED INSTRUCTION WITH CORRESPONDING GOLDEN TAG STORED IN MEMORY DEVICE IN EVENT OF CACHE MISS

CROSS REFERENCE TO RELATED APPLICATIONS

This application claims the benefit of U.S. Provisional Application No. 63/428,425, filed on Nov. 29, 2022. The content of the application is incorporated herein by reference.

BACKGROUND OF THE INVENTION

1. Field of the Invention

The present invention is related to security-related management of instructions, and more particularly, to an apparatus and a method for performing an authenticated encryption with associated data (AEAD) operation of an encrypted instruction and a golden tag corresponding to the encrypted instruction stored in a memory device in an event of a cache miss.

2. Description of the Prior Art

When a central processing unit (CPU) intends to execute an instruction, the CPU may request a cache for the instruction first. If the CPU finds the instruction in the cache (which may be referred to as a "hit"), the CPU can quickly load the instruction from the cache. If the CPU fails to find the instruction in the cache (which may be referred to as a "cache miss"), the cache may request a main memory for the instruction. For security purposes, associated security management may be applied to instructions stored in the main memory, which is configured to prevent any tampered instruction being executed by the CPU. However, the security management of the related art typically involves software level operations of the CPU, which requires more setting operations of the related registers, and the hardware for the security management can work normally only after those setting operation of the registers.

Thus, there is a need for a novel method and associated architecture, which can perform related authentication upon any encrypted instruction loaded from the main memory in an on-the-fly manner (e.g. the security management is performed by the hardware) without involving the software level operations of the CPU.

SUMMARY OF THE INVENTION

An objective of the present invention is to provide an apparatus and a method for performing an authenticated encryption with associated data (AEAD) operation of an encrypted instruction and a golden tag corresponding to the encrypted instruction stored in a memory device in an event of a cache miss, which can perform authentication upon instructions read from the memory device for the cache without involving software level operations of a central processing unit (CPU).

At least one embodiment of the present invention provides an apparatus for performing an AEAD operation of an encrypted instruction and a golden tag corresponding to the encrypted instruction stored in a memory device in an event of a cache miss. The apparatus comprises a bus control circuit, a block buffer, a tag buffer and an AEAD circuit, wherein the block buffer is coupled to the bus control circuit, the tag buffer is coupled to the bus control circuit, and the AEAD circuit is coupled to the block buffer and the tag buffer. The bus control circuit is configured to receive a read address from a cache and obtain the encrypted instruction and the golden tag from the memory device according to the read address. The block buffer is configured to receive the encrypted instruction from the bus control circuit and store the encrypted instruction, wherein a size of the block buffer is preset to be N times a size of one cache line of the cache, and N is a positive integer. The tag buffer is configured to receive the golden tag from the bus control circuit and store the golden tag. The AEAD circuit is configured to receive the encrypted instruction from the block buffer and the golden tag from the tag buffer, to compute an authentication tag according to the encrypted instruction, and to compare the golden tag and the authentication tag to determine whether the encrypted instruction is tampered or not.

At least one embodiment of the present invention provides a method for performing an AEAD operation of an encrypted instruction and a golden tag corresponding to the encrypted instruction stored in a memory device in an event of a cache miss. The method comprises: receiving a read address from a cache for accessing the memory device according to the read address, in order to obtain the encrypted instruction and the golden tag from the memory device; writing the encrypted instruction and the golden tag into a block buffer and a tag buffer, respectively, wherein a size of the block buffer is preset to be N times a size of one cache line of the cache, and N is a positive integer; reading the encrypted instruction and the golden tag from the block buffer and the tag buffer, respectively, to compute an authentication tag according to the encrypted instruction, and to compare the golden tag and the authentication tag to determine whether the encrypted instruction is tampered or not.

The apparatus and the method provided by the embodiments of the present invention can preset the size of the block buffer, which allow the AEAD operation to be performed by the hardware, to thereby achieve the goal of performing the AEAD operation in an on-the-fly manner, i.e. an on-the-fly AEAD (OTFAEAD) operation. Thus, the present invention can perform authentication upon the encrypted instruction and the corresponding golden tag stored in the memory device, which checks whether the encrypted instruction is available before being utilized by the cache or the CPU without involving the software level operations of the CPU.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
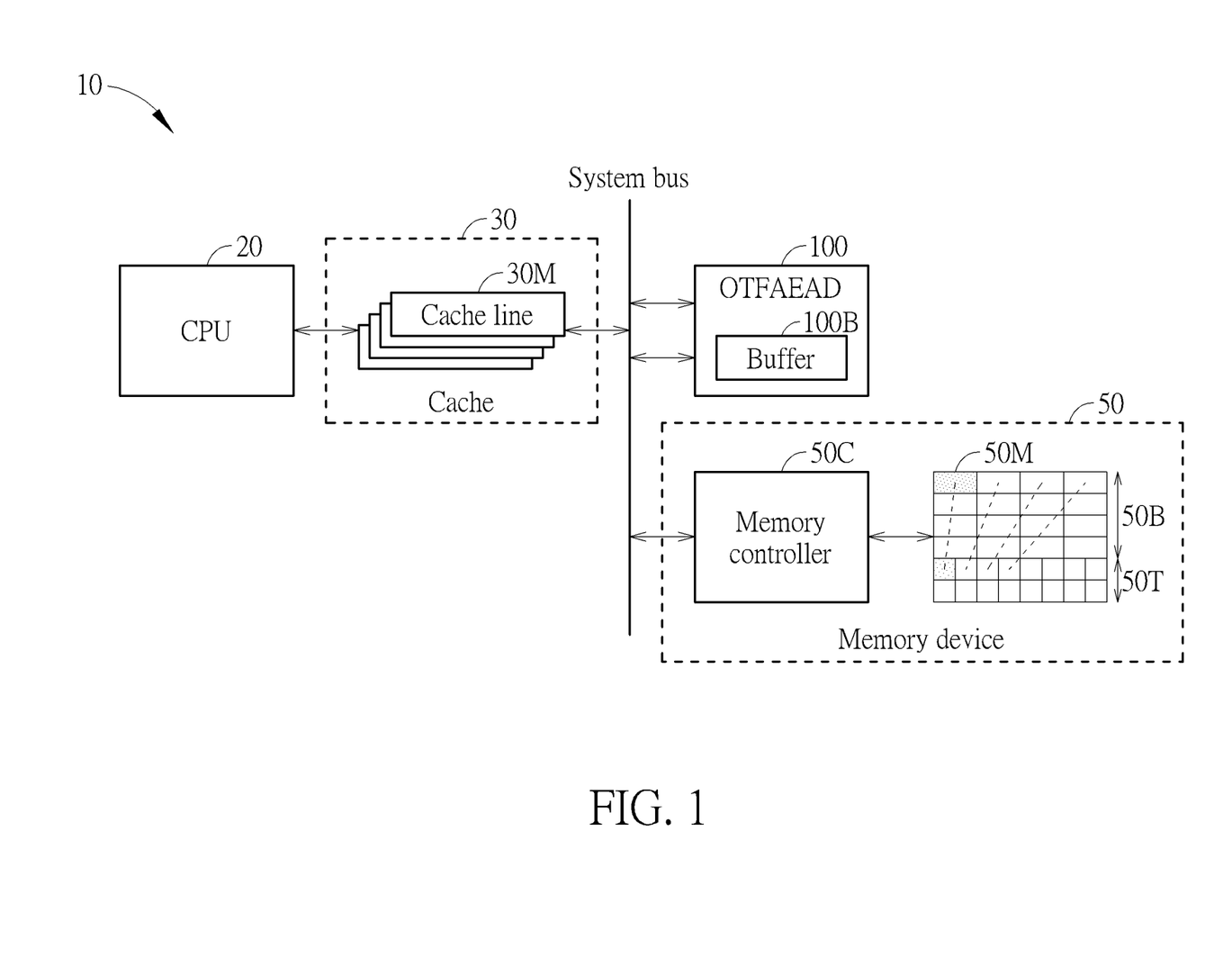
FIG. 1 is a diagram illustrating an electronic device according to an embodiment of the present invention.

FIG. 1 is a diagram illustrating an electronic device 10 according to an embodiment of the present invention. As shown in FIG. 1, the electronic device 10 may comprise a central processing unit 20, a cache 30, an on-the-fly authenticated encryption with associated data (OTFAEAD) device 100 and a memory device 50, where the cache 30, the OTFAEAD 100 and the memory device 50 are coupled to one another via a system bus. The CPU 20 may control an overall operation of the electronic device 10, and the CPU 20 may access the cache 30 (e.g. cache lines 30M therein) to obtain associated data or instruction when needed. The cache 30 may control at least one control unit (not shown for brevity) for controlling operations related to access of the cache lines 30M. More particularly, operations of the CPU 20 are performed in units of the cache lines 30M. For example, each operation of the CPU 20 involves storage with a size of one cache line 30M. The OTFAEAD device 100 may comprise at least one buffering storage such as a buffer 100B, which is configured to buffer at least one data or instruction loaded from the memory device 50 before providing the data or instruction to the cache 30. The memory device 50 may comprise a memory controller 50C and a main memory 50M, where the memory controller 50C is configured to control access of the main memory 50M, and the main memory is configured to store encrypted data or encrypted instructions and corresponding golden tags. For brevity, the present invention will focus on management of the encrypted instructions stored in the main memory, but the present invention is not limited thereto.

In this embodiment, the main memory 50M may comprises a block array 50B and a tag array 50T, where the block array 50B is configured to store the encrypted instructions, and the tag array 50T is configured to store the golden tags respectively corresponding to the encrypted instructions stored in the block array 50B. For example, each CPU instruction may be encrypted according to a key data and an address of this CPU instruction to be stored in the main memory, for obtaining an encrypted version of the CPU instruction (i.e. an encrypted instruction) and a golden tag, and this encrypted instruction and this golden tag may be stored in the block array 50B and the tag array 50T, respectively. When the CPU 20 request for this CPU instruction but is not found in the cache 30, the cache 30 may then request the OTFAEAD 100 to load this encrypted instruction and this golden tag from the main memory 50 into the buffer 100B, where the OTFAEAD 100 may perform authentication upon this encrypted instruction according to this golden tag in order to check whether this encrypted instruction is tampered or not. Bases on the above operations, when all encrypted instructions stored in the block array 50B are divided into M blocks (e.g. M is a positive integer), M golden tags may be computed according to the M blocks stored in the block array 50B and may be stored in the tag array 50T, where the M blocks are respectively correspond to the M golden tags (e.g. with an one-to-one mapping relationship). It should be noted that a size of one golden tag is fixed with regardless of the number of the golden tags (i.e. a value of M). where a smaller value of M results in less storage requirement of the M golden tags but a greater block size (which requires a long time for generating one corresponding tag), and a bigger value of M results in a smaller block size (which result in less computing time to generate one tag) but a higher storage requirement of the M golden tags. An optimized choice of M may be determined according to available space of the main memory 50M and allowable computing time, and is not meant to be a limitation of the present invention.

Figure 2:
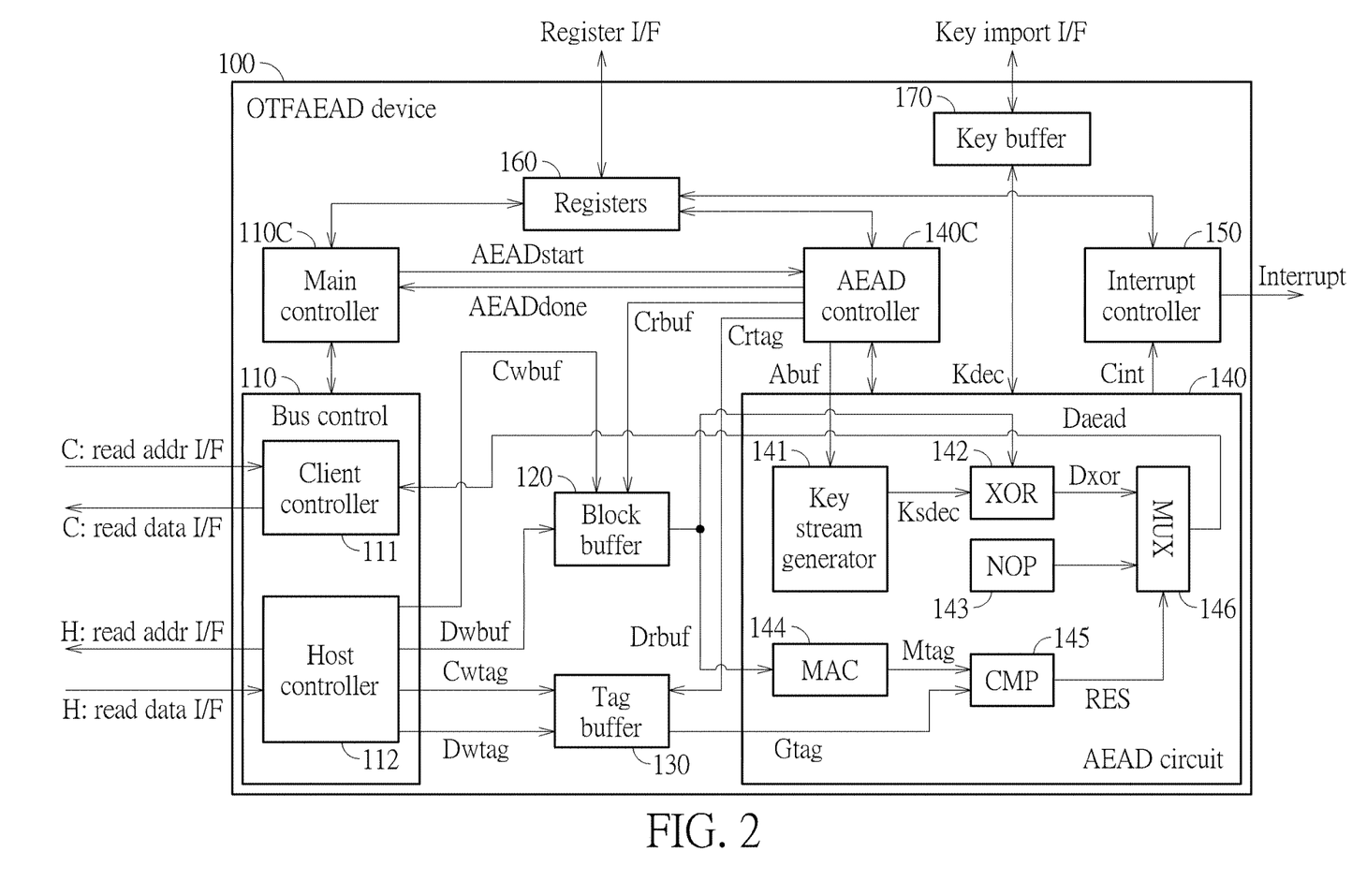
FIG. 2 is a diagram illustrating an on-the-fly authenticated encryption with associated data (OTFAEAD) device according to an embodiment of the present invention.

FIG. 2 is a diagram illustrating an apparatus (e.g. the OTFAEAD device 100 shown in FIG. 1) for performing an OTFAEAD operation of an encrypted instruction stored in the memory device 50 according to an embodiment of the present invention. As shown in FIG. 1, the OTFAEAD device 100 may comprise a bus control circuit 110 (labeled "Bus control" in figures for brevity), a block buffer 120, a tag buffer 130 and an authenticated encryption with associated data (AEAD) circuit 140, where the block buffer 120 and the tag buffer 130 may be examples of the buffer 100B shown in FIG. 1. Both the block buffer 120 and the tag buffer 130 are coupled to the bus control circuit 110, and the AEAD circuit 140 is coupled to the block buffer 120 and the tag buffer 130. In this embodiment, when the CPU 20 fails to find a requested instruction in the cache 30 (e.g. which may be referred to as an event of a cache miss), the bus control circuit 110 may receive a read address (which correspond to the requested instruction) from the cache 30, and then request the memory device 50 for the encrypted instruction (which is an encrypted version of the requested instruction), in order to obtain the encrypted instruction and a golden tag corresponding to the encrypted instruction from the memory device 50 according to the read address. The block buffer 120 is configured to receive the encrypted instruction from the bus control circuit 110 and store the encrypted instruction, wherein a size of the block buffer 120 is preset to be N times a size of one cache line 30M of the cache 30, and N is a positive integer. The tag buffer 130 is configured to receive the golden tag from the bus control circuit 110 and store the golden tag. The AEAD circuit 140 is configured to perform an AEAD operation upon the encrypted instruction and the golden tag. More particularly, the AEAD circuit 140 is configured to receive the encrypted instruction from the block buffer and the golden tag from the tag buffer, to compute an authentication tag according to the encrypted instruction, and to compare the golden tag and the authentication tag to determine whether the encrypted instruction is tampered or not.

In this embodiment, the bus control circuit 110 may comprise client controller 111 and a host controller 112. As for communications between the cache 30 and the OTFAEAD device 100, the OTFAEAD device 100 may serve as a client side, and the communications between the cache 30 and the OTFAEAD device 100 is controlled by the client controller 111. In particularly, the client controller 111 is configured to receive the read address from the cache 30 via a read address interface (labeled "C: read addr I/F" in FIG. 2 for brevity), and respond a corresponding instruction to the cache 30 via a read data interface (labeled "C: read data I/F"). As for communications between the memory device 50 and the OTFAEAD device 100, the OTFAEAD device 100 may serve as a host side, and the communications between the memory device 50 and the OTFAEAD device 100 is controlled by the host controller 112. In particularly, the host controller 112 is configured to transmit the read address received by the client controller 111 and a tag address (which is associated with the read address) to the memory device 50 via a read address interface (labeled "H: read addr I/F" in FIG. 2 for brevity), in order to obtain the encrypted instruction and the golden tag from the memory device 50 according to the read address and the tag address via a read data interface (labeled "H: read data I/F"). For example, the host controller 112 may obtain the encrypted instruction from the block array 50B of the memory device 50 via the read data interface (which is labeled "H: read data I/F") according to the read address (which is transmitted by the read address interface labeled "H: read addr I/F"), and may obtain the golden tag from the tag array 50T of the memory device 50 via the read data interface (which is labeled "H: read data I/F") according to the tag address (which is transmitted by the read address interface labeled "H: read addr I/F").

In this embodiment, the OTFAEAD device 100 may further comprises a main controller 110C and an AEAD controller 140C. The main controller 110C is coupled to the bus control circuit 110, and is configured to control operations of the bus control circuit 110. The AEAD controller 140C is coupled to the AEAD circuit 140 and the main controller 110C, and is configured to control operations of the AEAD circuit 140. When the read address is received from the cache 30 by the bus control circuit 110 (e.g., the cache miss occurs), the bus control circuit 110 may communicate with the main controller 110C, and the main controller 110C may transmit a start signal AEADstart to the AEAD controller 140C, in order to make the AEAD controller 140C control the AEAD circuit 140 to start the AEAD operation. When the AEAD operation is completed, the AEAD controller 140C may transmit a finish signal AEAD done to the main controller 110C, in order to inform the main controller that the AEAD operation is completed. In detail, after the bus control circuit 110 (e.g. the host controller 112) receives the encrypted instruction and the golden tag from the memory device 50, the memory controller 110C may control the bus control circuit 110 (e.g. the host controller 112) to transmit write control signals Cwbuf and Cwtag to the block buffer 120 and the tag buffer 130, respectively, in order to write the encrypted instruction (which is carried by a write data signal Dwbuf) and the golden tag (which is carried by a write data signal Dwtag) into the block buffer 120 and the tag buffer 130, respectively. The AEAD controller 140 may transmit read control signals Crbuf and Crtag to the block buffer 120 and the tag buffer 130, respectively, in order to allow the AEAD circuit 140 to obtain the encrypted instruction (which is carried by a read data signal Drbuf) and the golden tag such as a golden tag Gtag from the block buffer 120 and the tag buffer 130, respectively. In addition, the AEAD controller 140C may receive the read address from the bus control circuit 110 (e.g. the host controller 112 therein), to allow the AEAD controller 140C to transmit an address signal Abuf (which carries the read address) to the AEAD circuit 140, where the read address carried by the address signal Abuf corresponds to the encrypted instruction carried by the write data signal Dwbuf (e.g. the read address carried by the address signal Abuf is an address at which the main memory 50M stores the encrypted instruction). Further details related to the address signal Abuf will be described later.

In this embodiment, the OTFAEAD device 100 may further comprise a register 160, which is configured to store an address offset associated with the memory device 50, to allow the bus control circuit 110 derive a tag address (e.g. the tag address to be transmitted to the memory device 50 via the read address interface labeled "H: read addr I/F") according to the read address and the address offset. The address offset may be written into the register 160 via a register interface (labeled "Register I/F" in FIG. 2 for brevity) by the CPU 20, but the present invention is not limited thereto. For example, the main memory 50M may allocate multiple block addresses for storage of encrypted instructions (i.e. addresses of the block array 50B), and further allocate tag addresses which follows a last one of the multiple block addresses for storage of golden tags. Thus, the address offset may indicate a starting position of the storage of the golden tags, to allow the bus control circuit 110 to derive the tag address (e.g. a position of the golden tag corresponding to the encrypted instruction) according to the read address and the address offset (e.g. the tag address may be the read address plus the address offset), and the bus control circuit 110 (e.g. the host controller 112) may obtain the encrypted instruction according to the read address and obtain the golden tag according to the tag address.

In this embodiment, the OTFAEAD may further comprise a key buffer 170, which is configured to store key data Kdec, where the key data Kdec may be generated by a key generator (not shown), and the key data Kdec may be loaded into the key buffer 170 via a key import interface (labeled "Key import I/F" in FIG. 2 for brevity) when the electronic device 10 is powered on. In addition, the AEAD circuit 140 may perform the AEAD operation upon the encrypted instruction and the golden tag (e.g. the golden tag) according to the key data Kdec.

In this embodiment, the AEAD circuit 140 may comprise a message authentication code (MAC) circuit 144 (labeled "MAC" in FIG. 2 for brevity) and a comparator 145 (labeled "CMP" in FIG. 2 for brevity), where the comparator 145 is coupled to the MAC circuit 144. The MAC circuit 144 is configured to perform a MAC operation upon the encrypted instruction (which is carried by the read data signal Drbuf from the block buffer 120) according to the key data Kdec (e.g. a portion or all of the key data Kdec), for computing and generating an authentication tag Mtag, and the comparator 145 is configured to compare the authentication tag Mtag with the golden tag Gtag for generating a comparison result RES, where the comparison result RES may indicate whether the authentication tag Mtag matches the golden tag Gtag, and the AEAD circuit 140 may check whether the encrypted instruction is tampered or not according to the comparison result RES. When the comparison result RES indicates that the authentication tag Mtag matches the golden tag Gtag, the AEAD circuit 140 may determines that the encrypted instruction is not tampered, and the AEAD circuit may decrypts the encrypted instruction for generating a decrypted instruction Dxor for being transmitted to the cache 30 by the bus control circuit 110. When the comparison result RES indicates that the authentication tag Mtag does not match the golden tag Gtag, the AEAD circuit 140 may determine that the encrypted instruction is tampered, and the AEAD circuit 140 may output a no-operation (NOP) instruction 143 for being transmitted to the cache 30 by the bus control circuit 110.

In detail, the AEAD circuit 140 may further comprise a key stream generator 141, an exclusive-OR (XOR) logic circuit 142 and a multiplexer 146 (labeled "MUX" in FIG. 2), where the XOR logic circuit 142 is coupled to the key stream generator 141, and the multiplexer 146 is coupled to the XOR logic circuit 142 and a register (not shown) storing the NOP instruction 143. The key stream generator 141 is configured to generate a key stream Ksdec according to the key data Kdec (e.g. a portion or all of the key data Kdec) and the read address (which may be carried by the address signal Abuf from the AEAD controller 140C). In some embodiments, the key stream generator 141 may perform an XOR logic operation based on the key data Kdec and the read address to generate the key stream Ksdec. For example, the key stream generator 141 may perform an XOR logic operation upon the key data Kdec and the read address to generate the key stream Ksdec. In another example, the key stream generator 141 may perform an XOR logic operation upon the key data Kdec and a modified read address to generate the key stream Ksdec, where the modified read address may be the read address plus a predetermined offset such as the read address plus one, but the present invention is not limited thereto. The XOR logic circuit 142 is configured to perform an XOR logic operation upon the encrypted instruction (which is carried by the read data signal Drbuf from the block buffer 120) and the key stream Ksdec for generating the decrypted instruction Dxor. The multiplexer 146 may select one of the encrypted instruction Dxor and the NOP instruction 143 to be an AEAD result Daead to be responded to the cache 30 by the bus control circuit 110 according to the comparison result RES.

In this embodiment, the OTFAEAD device 100 may further comprise an interrupt controller 150, wherein the interrupt controller 150 is coupled to the AEAD circuit 140 and is configured to generate an interrupt signal (labeled "Interrupt" in FIG. 2 for brevity) for being transmitted to the cache 30 to inform that the encrypted instruction is tampered when the AEAD circuit 140 determines that the encrypted instruction is tampered. For example, when the comparison result RES indicates that the authentication tag Mtag does not matches the golden tag Gtag, the AEAD circuit may output an interrupt control signal Cint to the interrupt controller 150, in order to trigger the interrupt controller 150 to output the interrupt signal, but the present invention is not limited thereto.

In this embodiment, the parameter N may be equal to one. For example, the block buffer 120 may comprise one cache line buffer only, which has a storage size that is identical to that of one cache line 30M. More particularly, a size of the encrypted instruction may be equal to the size of one cache line 30M of the cache 30.

Figure 3:
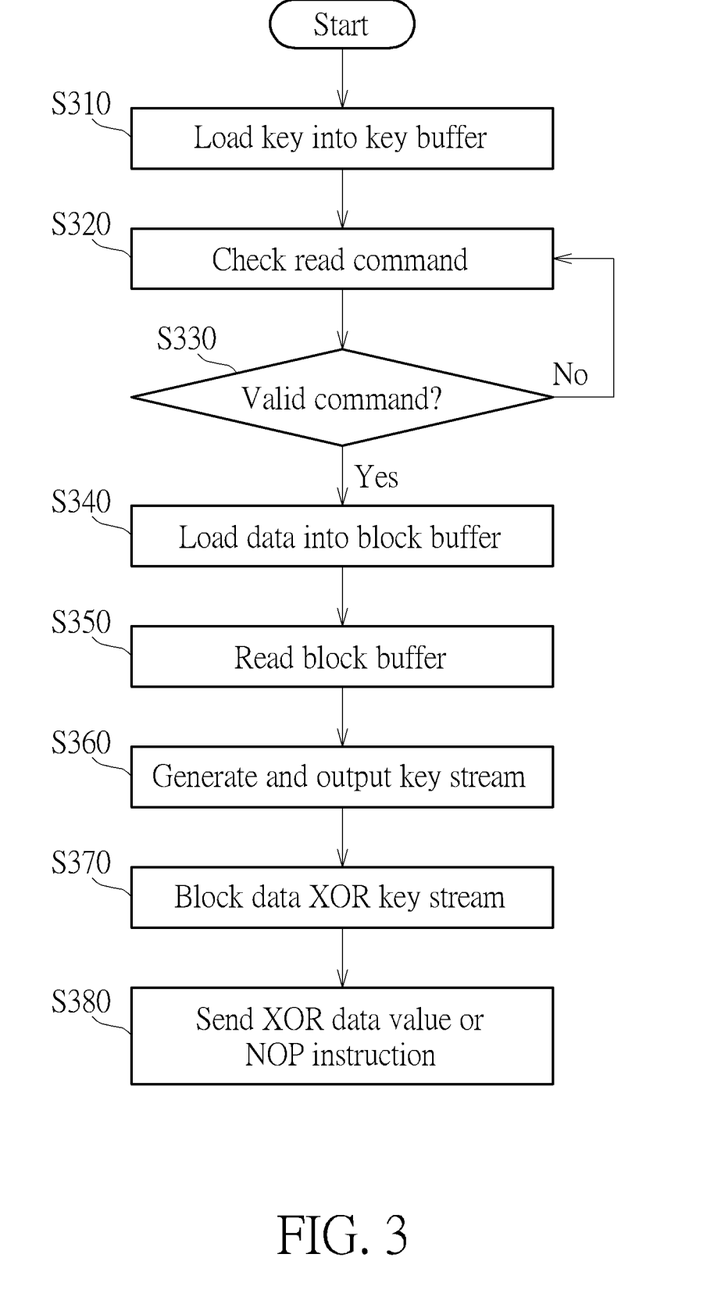
FIG. 3 is a diagram illustrating a working flow of instruction decryption according to an embodiment of the present invention.

FIG. 3 is a diagram illustrating a working flow of instruction decryption according to an embodiment of the present invention, where the working flow may be executed by the OTFAEAD device 100 shown in FIG. 1. It should be note that the working flow shown in FIG. 3 is for illustrative purposes only, and is not meant to be a limitation of the present invention. For example, one or more steps may be added, deleted or modified in the working flow shown in FIG. 3. In addition, if a same result can be obtained, these steps do not have to be executed in the exact order shown in FIG. 3. For example, one or more steps shown in FIG. 3 may be executed in parallel.

In Step S310, when the electronic device 10 (more particularly, the OTFAEAD device 100 therein) is powered on, the key data Kdec may be loaded into the key buffer 170 (labeled "Load key into key buffer" in FIG. 3 for brevity).

In Step S320, the bus control circuit 110 (more particularly, the client controller 111 therein) may check a read command (e.g. a read command which carries the read address mentioned above) from the cache 30 for generating a check result (labeled "Check read command" in FIG. 3 for brevity). For example, the check result may indicate whether this command is a valid read command or not.

In Step S330, the bus control circuit 110 (more particularly, the client controller 111 therein) may determine whether the check result indicates that this read command is valid (labeled "Valid command?" in FIG. 3 for brevity). If the determination result shows "Yes" (i.e. the read command is valid), the working flow proceeds with Step S340; and if the determination result shows "No" (i.e. the read command is invalid), the working flow proceeds with Step S320.

In Step S340, the bus control circuit 110 (more particularly, the host controller 112 therein) may load data (e.g. the encrypted instruction) into the block buffer 120.

In Step S350, the AEAD circuit 140 may read the block buffer 120 to obtain the encrypted instruction from the block buffer 120 (labeled "Read block buffer" in FIG. 3 for brevity).

In Step S360, the AEAD circuit 140 (more particularly, the key stream generator 141) may generate and output the key stream Ksdec.

In Step S370, the AEAD circuit 140 (e.g. the XOR logic circuit 142) may perform the XOR logic operation upon block data (e.g. the encrypted instruction) and the key stream Ksdec for generating the decrypted instruction Dxor (labeled "Block data XOR key stream").

In Step S380, the AEAD circuit 140 may send an XOR data value (e.g. the decrypted instruction Dxor) output from the XOR logic circuit 142 or the NOP instruction 143 to the bus control circuit 110 (e.g. the client controller 111 therein) for being transmitted to the cache 30 (labeled "Send XOR data vale or NOP instruction").

Figure 4:
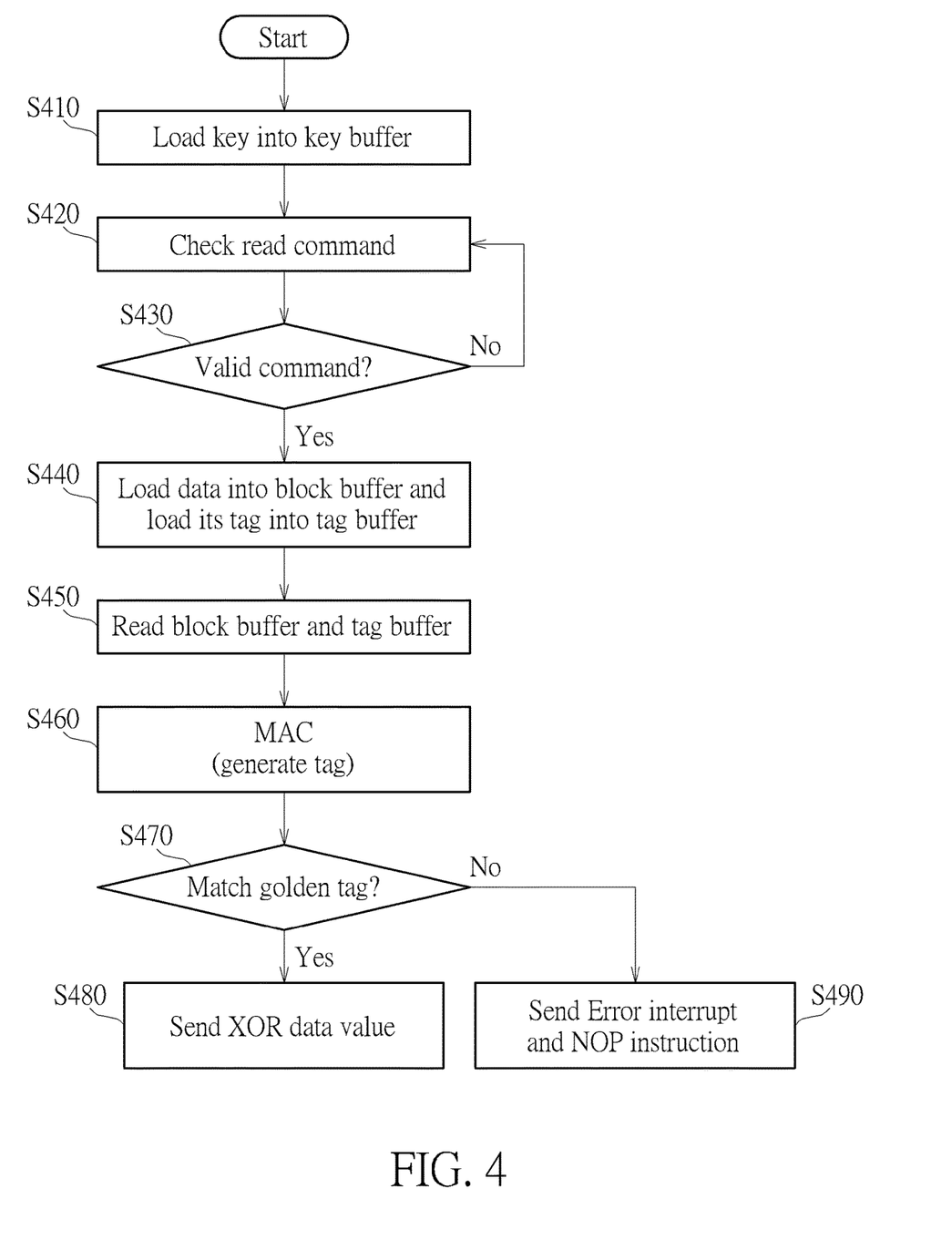
FIG. 4 is a diagram illustrating a working flow of instruction authentication according to an embodiment of the present invention.

FIG. 4 is a diagram illustrating a working flow of instruction authentication according to an embodiment of the present invention, where the working flow may be executed by the OTFAEAD device 100 shown in FIG. 1. It should be note that the working flow shown in FIG. 4 is for illustrative purposes only, and is not meant to be a limitation of the present invention. For example, one or more steps may be added, deleted or modified in the working flow shown in FIG. 4. In addition, if a same result can be obtained, these steps do not have to be executed in the exact order shown in FIG. 4. For example, one or more steps shown in FIG. 4 may be executed in parallel. In addition, the working flow of instruction decryption shown in FIG. 3 and the working flow of instruction authentication shown in FIG. 4 may be executed in parallel by the OTFAEAD device 100, but the present invention is not limited thereto.

In Step S410, when the electronic device 10 (more particularly, the OTFAEAD device 100 therein) is powered on, the key data Kdec may be loaded into the key buffer 170 (labeled "Load key into key buffer" in FIG. 4 for brevity).

In Step S420, the bus control circuit 110 (more particularly, the client controller 111 therein) may check a read command (e.g. a read command which carries the read address mentioned above) from the cache 30 for generating a check result (labeled "Check read command" in FIG. 4 for brevity). For example, the check result may indicate whether this command is a valid read command or not.

In Step S430, the bus control circuit 110 (more particularly, the client controller 111 therein) may determine whether the check result indicates that this read command is valid (labeled "Valid command?" in FIG. 4 for brevity). If the determination result shows "Yes" (i.e. the read command is valid), the working flow proceeds with Step S440; and if the determination result shows "No" (i.e. the read command is invalid), the working flow proceeds with Step S420.

In Step S440, the bus control circuit 110 (more particularly, the host controller 112 therein) may load data (e.g. the encrypted instruction) into the block buffer 120 and load its tag (e.g. the golden tag corresponding to the encrypted instruction) into the tag buffer 130.

In Step S450, the AEAD circuit 140 may read the block buffer 120 to obtain the encrypted instruction from the block buffer 120 and read the tag buffer 130 to obtain the golden tag from the tag buffer 130 (labeled "Read block buffer and tag buffer" in FIG. 4 for brevity).

In Step S460, the AEAD circuit 140 (more particularly, the MAC circuit 144 therein) may perform the MAC operation upon the encrypted instruction to compute and generate the authentication tag Mtag (labeled "MAC (generate tag)" in FIG. 4 for brevity).

In Step S470, the AEAD circuit 140 (more particularly, the comparator 145 therein) may determine whether the authentication tag Mtag matches the golden tag (e.g. the golden tag Gtag). If the determination result shows "Yes" (i.e. the authentication tag Mtag matches the golden tag Gtag), the working flow proceeds with Step S480; and if the determination result shows "No" ((i.e. the authentication tag Mtag does not match the golden tag Gtag), the working flow proceeds with Step S490.

In Step S480, the AEAD circuit 140 may send the XOR data value (e.g. the decrypted instruction Dxor) to the bus control circuit 110 (more particularly, the client controller 111) for being responded to the cache 30 (labeled "Send XOR data value").

In Step S490, the AEAD circuit 140 may send the interrupt signal to the cache 30 (e.g. the control unit therein) or the CPU 20 for informing an error, and send the NOP instruction 143 to the bus control circuit 110 (more particularly, the client controller 111) for being responded to the cache 30 (labeled "Send Error interrupt and NOP instruction").

Figure 5:
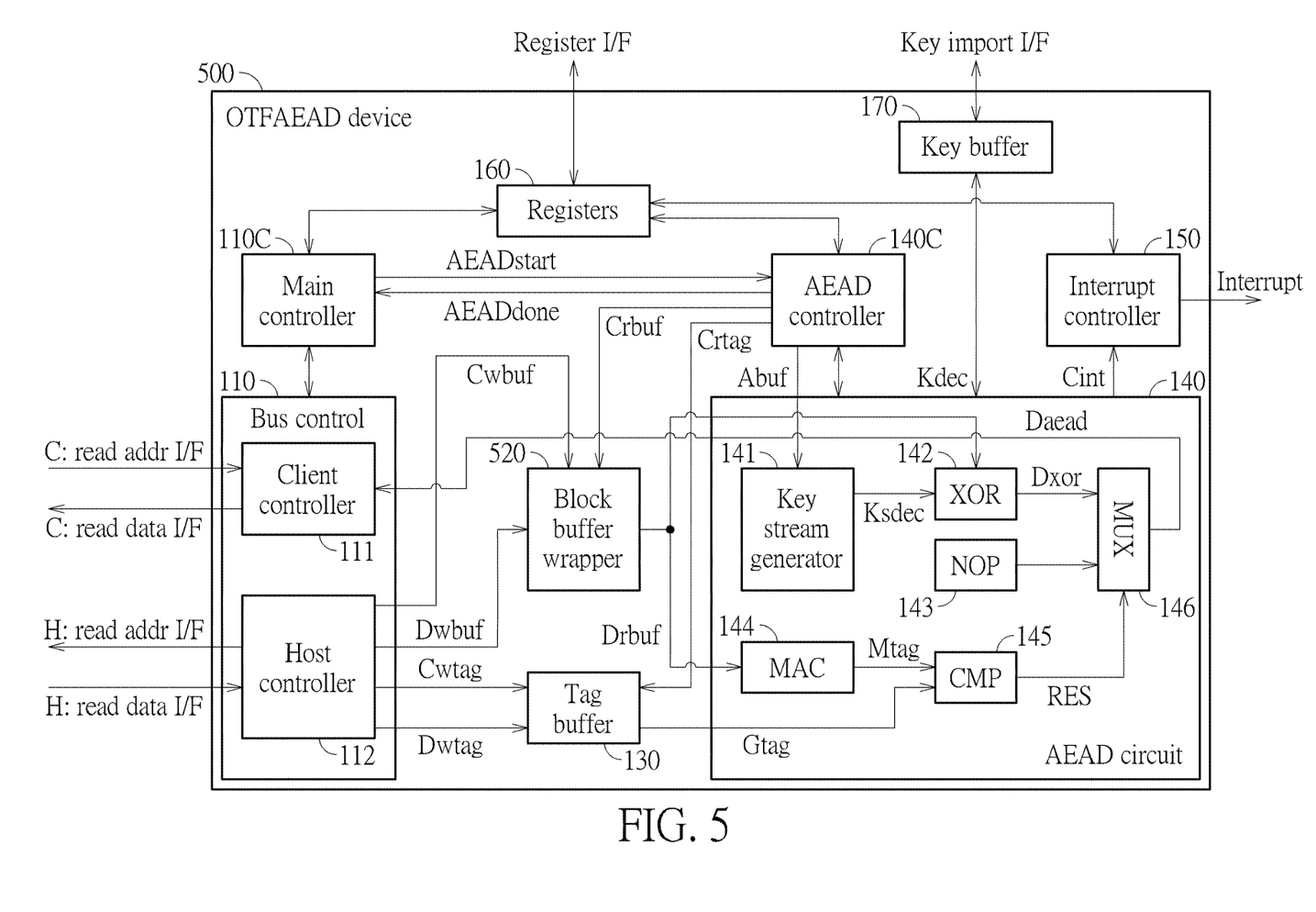
FIG. 5 is a diagram illustrating an OTFAEAD device according to another embodiment of the present invention.

FIG. 5 is a diagram illustrating an OTFAEAD device 500 according to another embodiment of the present invention, wherein the only difference between the OTFAEAD device 500 and the OTFAEAD device 100 shown in FIG. 2 is that the block buffer 120 is implemented with a block buffer wrapper 520. As the other components shown in FIG. 5 are identical to that shown in FIG. 2, related details will be omitted for brevity. In order to reduce the number of tags stored in the main memory 50 (e.g. reducing storage resource occupied by the tag array 50T), N may be greater than one, and the size of the encrypted instruction may be equal to N times the size of one cache line 30M of the cache 30.

Figure 6:
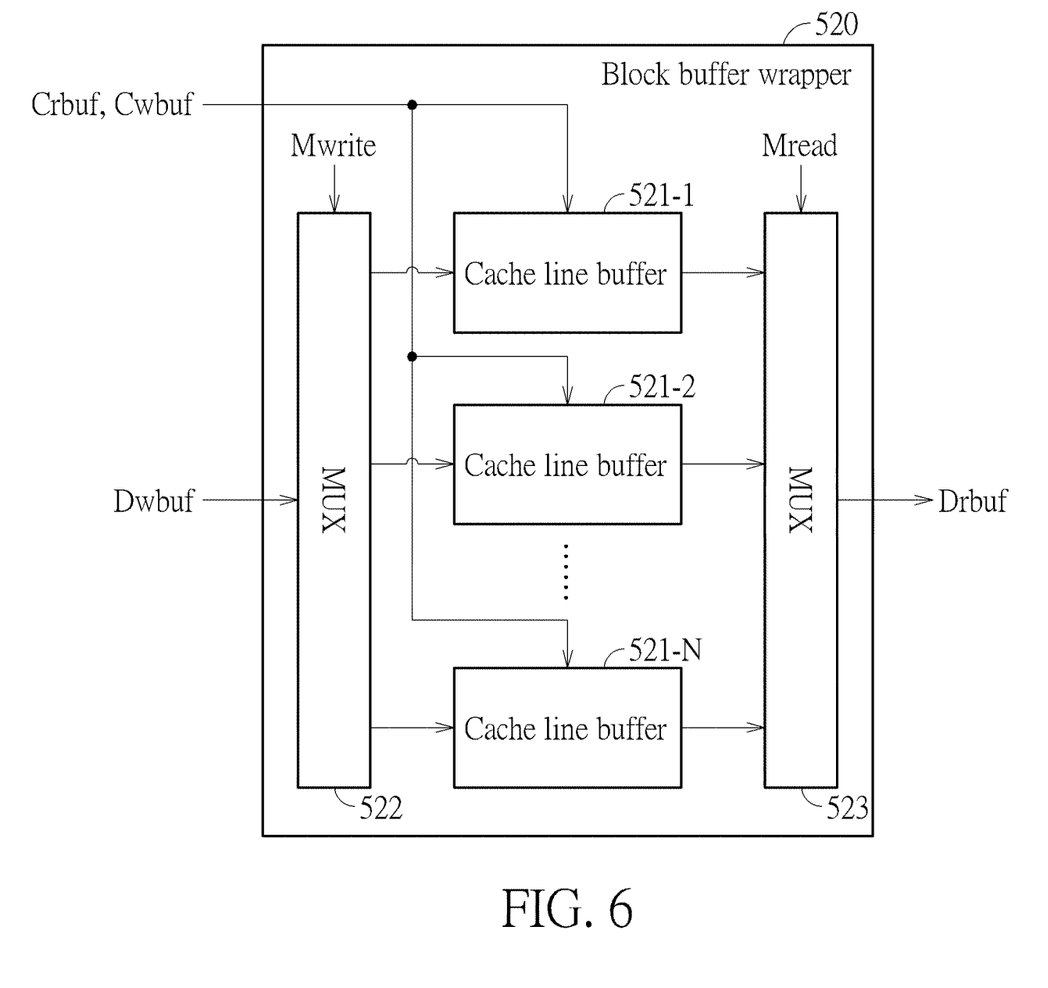
FIG. 6 is a diagram illustrating a block buffer wrapper according to another embodiment of the present invention.

FIG. 6 is a diagram illustrating the block buffer wrapper 520 according to another embodiment of the present invention. As shown in FIG. 6, the block buffer wrapper 520 may comprise N cache line buffers such as cache line buffers 521-1, 521-2, . . . , and 521-N, where a size of each of the cache line buffers 521-1, 521-2, . . . , and 521-N is equal to the size of one cache line 30M of the cache 30, and the encrypted instruction may be divided into N partial encrypted instructions for being respectively stored in the cache line buffers 521-1, 521-2, . . . , and 521-N. In addition, the bus control circuit 110 (more particularly, the host controller 112) may write the N partial encrypted instructions into the cache line buffers 521-1, 521-2, . . . , and 521-N sequentially, and the AEAD circuit 140 may obtains the N partial encrypted instructions from the cache line buffers 521-1, 521-2, . . . , and 521-N sequentially. For example, the block buffer wrapper 520 may further comprise multiplexers 522 and 523 (labeled "MUX"), where both the multiplexers 522 and 523 are coupled to the cache line buffers 521-1, 521-2, . . . , and 521-N. The multiplexer 522 is configured to control a sequential write operation of the N partial encrypted instructions (which is carried by the write data signal Dwbuf sent from the bus control circuit 110 such as the host controller 112) according to a write control signal Mwrite, where the write control signal Mwrite may be generated according to at least one portion of the write control signal Cwbuf, but the present invention is not limited thereto. The multiplexer 523 is configured to control a sequential read operation of the N partial encrypted instructions (which is carried by the read data signal Drbuf sent to the AEAD circuit 140) according to a read control signal Mread, where the read control signal Mread may be generated according to at least one portion of the read control signal Crbuf, but the present invention is not limited thereto.

Figure 7:
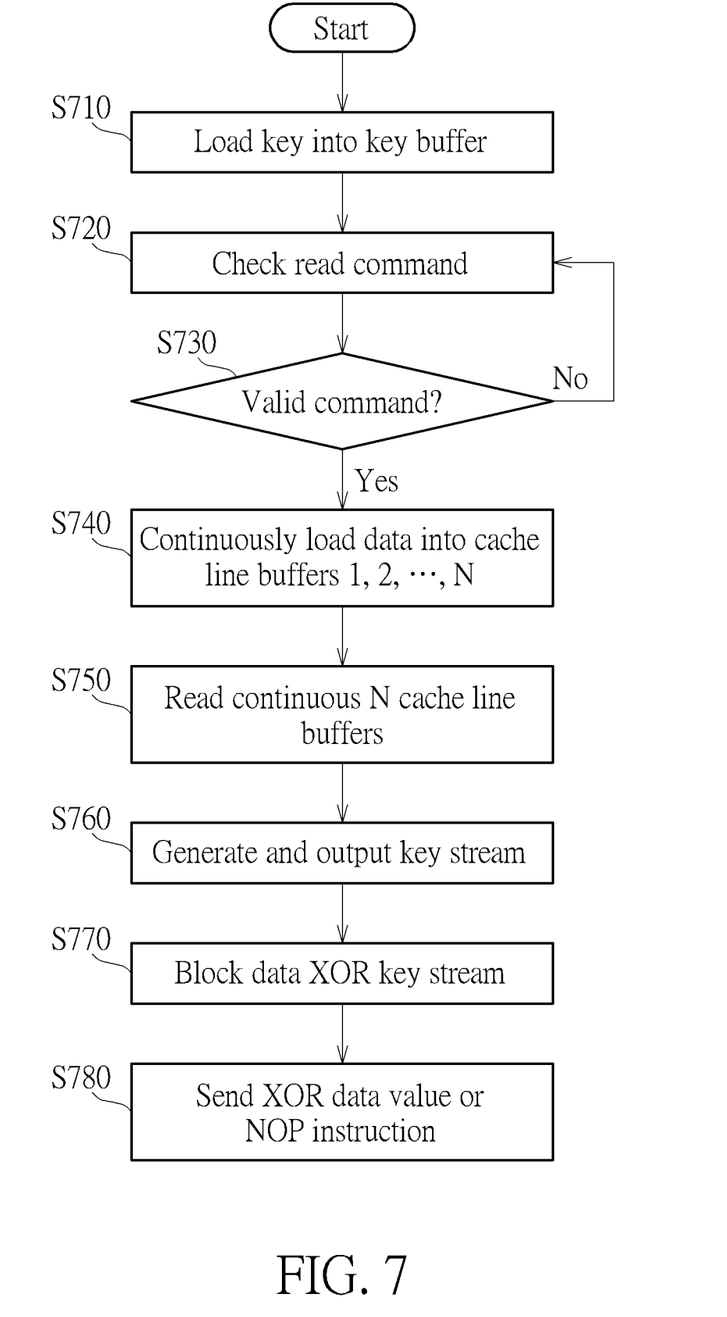
FIG. 7 is a diagram illustrating a working flow of instruction decryption according to another embodiment of the present invention.

FIG. 7 is a diagram illustrating a working flow of instruction decryption according to another embodiment of the present invention, where the working flow may be executed by the OTFAEAD device 500 shown in FIG. 5. It should be note that the working flow shown in FIG. 7 is for illustrative purposes only, and is not meant to be a limitation of the present invention. For example, one or more steps may be added, deleted or modified in the working flow shown in FIG. 7. In addition, if a same result can be obtained, these steps do not have to be executed in the exact order shown in FIG. 7. For example, one or more steps shown in FIG. 7 may be executed in parallel. In addition, the only difference between the working flow shown in FIG. 3 and the working flow shown in FIG. 7 is that Steps S340 and S350 are respectively replaced with Step S740 and S750, where Steps S710, S720, S730, S760, S770 and S780 are identical to Steps S310, S320, S330, S360, S370 and S380, respectively, and related details will be omitted for brevity.

In Step S740, the bus control circuit 110 (more particularly, the host controller 112 therein) may continuously load data (e.g. the N partial encrypted instructions) into the N cache line buffers such as 521-1, 521-2, . . . , and 521-N, respectively (labeled "Continuous load data into cache line buffers 1, 2, . . . , and N" in FIG. 7 for brevity).

In Step S750, the AEAD circuit 140 may continuously read the N cache line buffers such as 521-1, 521-2, . . . , and 521-N to obtain the N partial encrypted instructions from N cache line buffers such as 521-1, 521-2, . . . , and 521-N, respectively (labeled "Read continuous N cache line buffer" in FIG. 7 for brevity).

Figure 8:
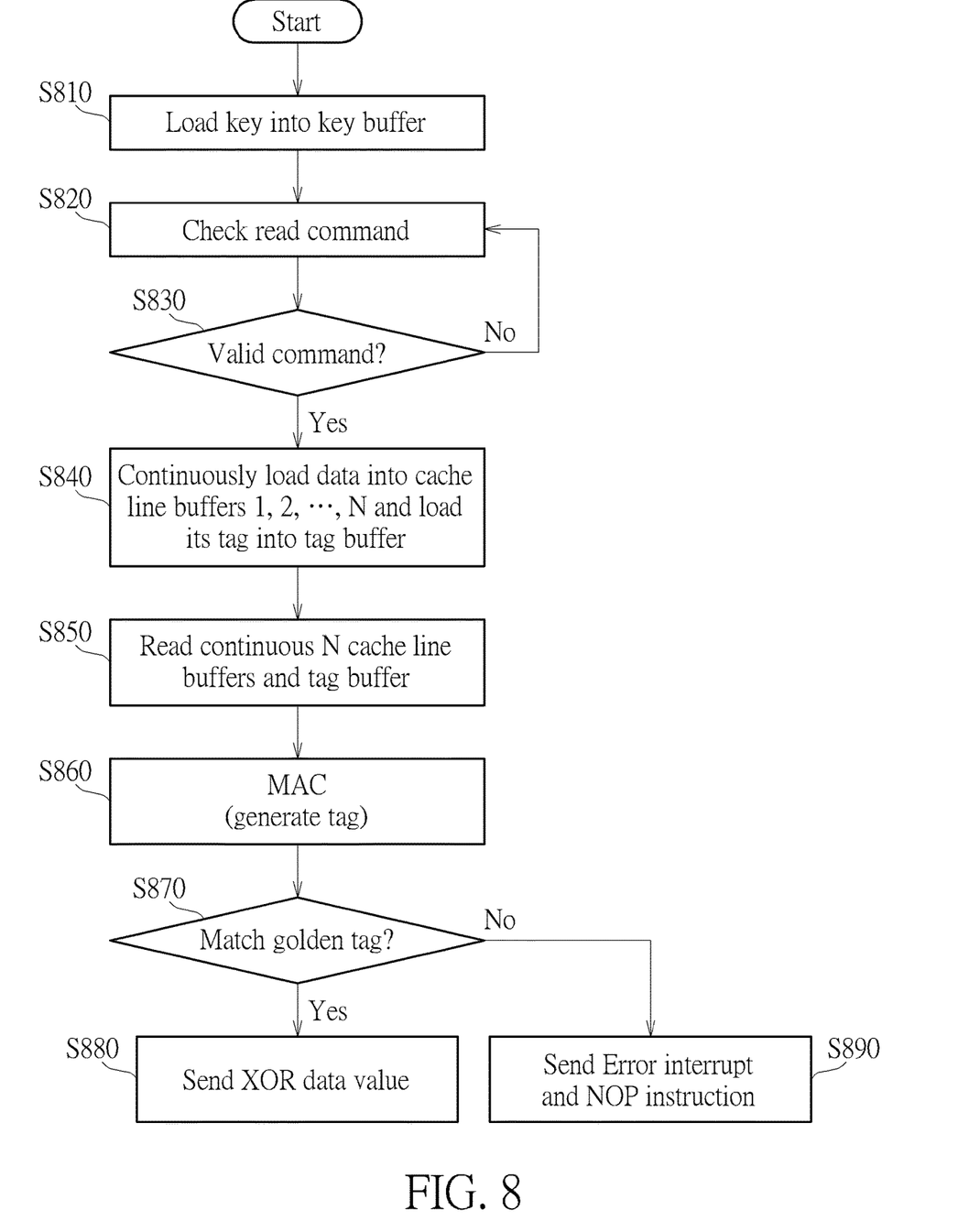
FIG. 8 is a diagram illustrating a working flow of instruction authentication according to another embodiment of the present invention.

FIG. 8 is a diagram illustrating a working flow of instruction authentication according to another embodiment of the present invention, where the working flow may be executed by the OTFAEAD device 500 shown in FIG. 5. It should be note that the working flow shown in FIG. 8 is for illustrative purposes only, and is not meant to be a limitation of the present invention. For example, one or more steps may be added, deleted or modified in the working flow shown in FIG. 8. In addition, if a same result can be obtained, these steps do not have to be executed in the exact order shown in FIG. 8. For example, one or more steps shown in FIG. 8 may be executed in parallel. In addition, the working flow of instruction decryption shown in FIG. 7 and the working flow of instruction authentication shown in FIG. 8 may be executed in parallel by the OTFAEAD device 500, but the present invention is not limited thereto. In addition, the only difference between the working flow shown in FIG. 4 and the working flow shown in FIG. 8 is that Steps S440 and S450 are respectively replaced with Step S840 and S850, where Steps S810, S820, S830, S860, S870, S880 and S890 are identical to Steps S410, S420, S430, S460, S470, S480 and S490, respectively, and related details will be omitted for brevity.

In Step S840, the bus control circuit 110 (more particularly, the host controller 112 therein) may continuously load data (e.g. the N partial encrypted instructions) into the N cache line buffers such as 521-1, 521-2, ..., and 521-N, respectively, and load its tag (e.g. the golden tag corresponding to the encrypted instruction) into the tag buffer 130 (labeled "Continuous load data into cache line buffers 1, 2, ..., and N and load its tag into tag buffer" in FIG. 8 for brevity).

In Step S850, the AEAD circuit 140 may continuously read the N cache line buffers such as 521-1, 521-2, ..., and 521-N to obtain the N partial encrypted instructions from N cache line buffers such as 521-1, 521-2, ..., and 521-N, respectively, and read the tag buffer 130 to obtain the golden tag from the tag buffer 130 (labeled "Read continuous N cache line buffers and tag buffer" in FIG. 8 for brevity).

Figure 9:
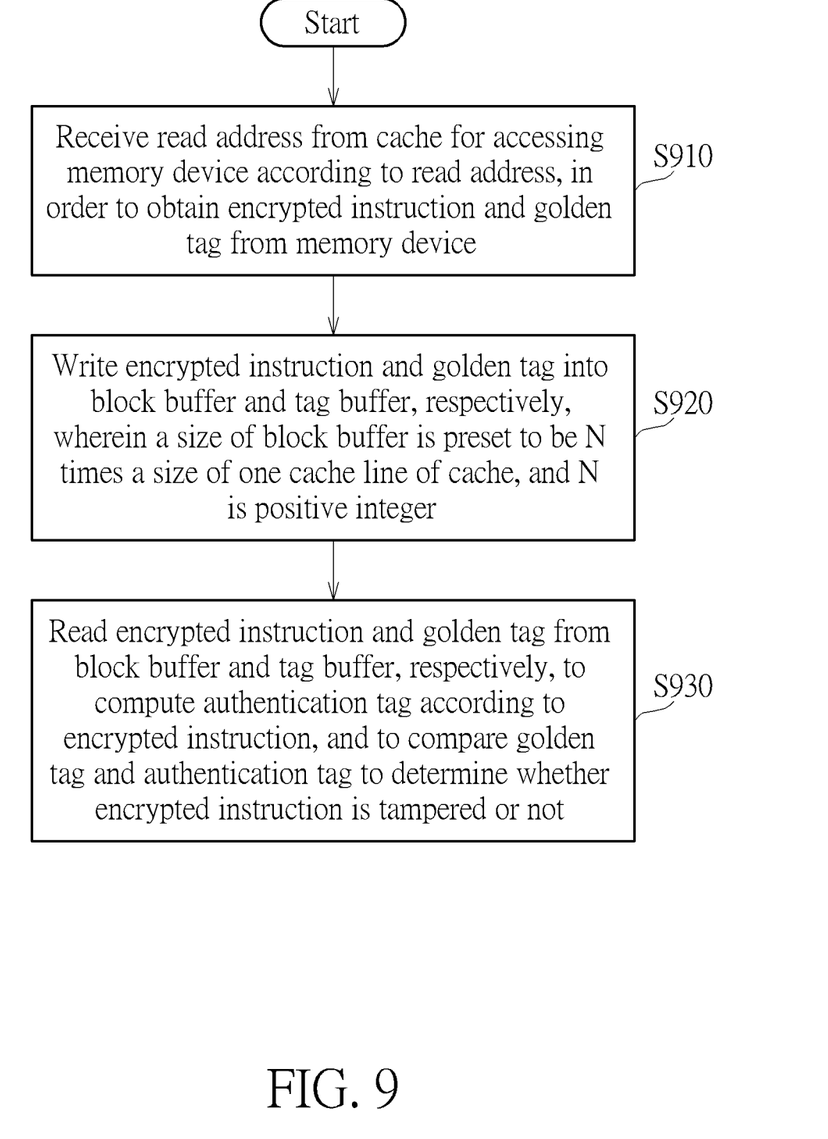
FIG. 9 is a diagram illustrating a working flow of a method for performing an OTFAEAD operation of an encrypted instruction stored in a memory device according to an embodiment of the present invention.

FIG. 9 is a diagram illustrating a working flow of a method for performing an AEAD operation (e.g. an OTFAEAD operation) of an encrypted instruction and a golden tag corresponding to the encrypted instruction stored in a memory device (e.g. the memory device 50 shown in FIG. 1) in an event of a cache miss according to an embodiment of the present invention, where the working flow may be executed by an OTFAEAD device such as any of the OTFAEAD device 100 shown in FIG. 1 and the OTFAEAD device 500 shown in FIG. 5. It should be note that the working flow shown in FIG. 9 is for illustrative purposes only, and is not meant to be a limitation of the present invention. For example, one or more steps may be added, deleted or modified in the working flow shown in FIG. 9. In addition, if a same result can be obtained, these steps do not have to be executed in the exact order shown in FIG. 9.

In Step S910, the OTFAEAD device may receive a read address from a cache for accessing the memory device according to the read address, in order to obtain the encrypted instruction and the golden tag from the memory device.

In Step S920, the OTFAEAD device may write the encrypted instruction and the golden tag into a block buffer and a tag buffer, respectively, wherein a size of the block buffer is preset to be N times a size of one cache line of the cache, and N is a positive integer.

In Step S930, the OTFAEAD device may read the encrypted instruction and the golden tag from the block buffer and the tag buffer, respectively, to compute an authentication tag according to the encrypted instruction, and to compare the golden tag and the authentication tag to determine whether the encrypted instruction is tampered or not.

To summarize, the OTFAEAD device and the method provided by the embodiments of the present invention can preset the size of the block buffer, which allow the AEAD operation to be performed by the hardware, to thereby achieve the goal of performing the AEAD operation in an on-the-fly manner. Thus, the present invention can perform authentication upon the encrypted instruction stored in the memory device without involving software level operations of the CPU.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for performing an authenticated encryption with associated data (AEAD) operation of an encrypted instruction with a golden tag corresponding to the encrypted instruction stored in a memory device in an event of a cache miss, comprising:

a bus control circuit, configured to receive a read address from a cache and obtain the encrypted instruction and the golden tag from the memory device according to the read address;

a block buffer, coupled to the bus control circuit, configured to receive the encrypted instruction from the bus control circuit and store the encrypted instruction, wherein a size of the block buffer is preset to be N times a size of one cache line of the cache, N is a positive integer, N is equal to one, and a size of the encrypted instruction is equal to the size of one cache line of the cache;

a tag buffer, coupled to the bus control circuit, configured to receive the golden tag from the bus control circuit and store the golden tag, wherein after the bus control circuit receives the encrypted instruction and the golden tag from the memory device, the bus control circuit transmits write control signals to the tag buffer, in order to write the golden tag carried by a write data signal into the tag buffer; and an AEAD circuit, coupled to the block buffer and the tag buffer, configured to receive the encrypted instruction from the block buffer and the golden tag from the tag buffer, to compute an authentication tag according to the encrypted instruction, and to compare the golden tag and the authentication tag to determine whether the encrypted instruction is tampered or not, wherein the AEAD circuit comprises:

a comparator, configured to compare the authentication tag with the golden tag for generating a comparison result; and a multiplexer (MUX) controlled by the comparator, coupled to a register storing an no-operation (NOP) instruction;

wherein the AEAD circuit checks whether the encrypted instruction is tampered or not according to the comparison result, when the comparison result indicates that the authentication tag does not match the golden tag, the AEAD circuit determines that the encrypted instruction is tampered, and the MUX selects the NOP instruction to be responded to the cache by the bus control circuit according to the comparison result.

2. The apparatus of claim 1, wherein the bus control circuit comprises:

a client controller, configured to receive the read address from the cache; and a host controller, configured to obtain the encrypted instruction and the golden tag from the memory device according to the read address, and transmits the write control signals and the write data signal to the tag buffer.

3. The apparatus of claim 1, further comprising:

a main controller, coupled to the bus control circuit, configured to control operations of the bus control circuit; and an AEAD controller, coupled to the AEAD circuit and the main controller, configured to control operations of the AEAD circuit;

wherein the main controller transmits a start signal to the AEAD controller when the bus control circuit receives the read address from the cache, in order to make the AEAD controller control the AEAD circuit to start the AEAD operation, and the AEAD controller transmits a finish signal to the main controller when the AEAD operation is completed, in order to inform the main controller that the AEAD operation is completed.

4. The apparatus of claim 1, further comprising:

a register, configured to store an address offset associated with the memory device, to allow the bus control circuit derive a tag address according to the read address and the address offset;

wherein the bus control circuit obtain the encrypted instruction according to the read address and obtain the golden tag according to the tag address.

5. The apparatus of claim 1, further comprising:

a key buffer, configured to store key data, wherein the AEAD circuit performs the AEAD operation upon the encrypted instruction and the golden tag according to the key data.

6. The apparatus of claim 5, wherein the AEAD circuit comprise:

a message authentication code (MAC) circuit, configured to perform a MAC operation upon the encrypted instruction according to the key data, for computing the authentication tag.

7. The apparatus of claim 6, wherein when the comparison result indicates that the authentication tag matches the golden tag, the AEAD circuit determines that the encrypted instruction is not tampered, and the AEAD circuit decrypts the encrypted instruction for generating a decrypted instruction for being transmitted to the cache by the bus control circuit.

8. The apparatus of claim 7, wherein the AEAD circuit further comprises:

a key stream generator, configured to generate a key stream according to the key data and the read address; and an exclusive-OR (XOR) logic circuit, coupled to the key stream generator, configured to perform an XOR logic operation upon the encrypted instruction and the key stream for generating the decrypted instruction.

9. The apparatus of claim 1, further comprising:

an interrupt controller, coupled to the AEAD circuit, configured to generate an interrupt signal to inform that the encrypted instruction is tampered when the AEAD circuit determines that the encrypted instruction is tampered.

10. A method for performing an authenticated encryption with associated data (AEAD) operation of an encrypted instruction and a golden tag corresponding to the encrypted instruction stored in a memory device in an event of a cache miss, comprising:

receiving a read address from a cache for accessing the memory device according to the read address, in order to obtain the encrypted instruction and the golden tag from the memory device;

writing the encrypted instruction and the golden tag into a block buffer and a tag buffer, respectively, wherein a size of the block buffer is preset to be N times a size of one cache line of the cache, N is a positive integer, N is equal to one, a size of the encrypted instruction is equal to the size of one cache line of the cache, after the encrypted instruction and the golden tag are received from the memory device, write control signals are transmitted to the tag buffer, in order to write the golden tag carried by a write data signal into the tag buffer; and reading the encrypted instruction and the golden tag from the block buffer and the tag buffer, respectively, to compute an authentication tag according to the encrypted instruction, and to compare the golden tag and the authentication tag to determine whether the encrypted instruction is tampered or not, wherein reading the encrypted instruction and the golden tag from the block buffer and the tag buffer respectively in order to perform the AEAD operation upon the encrypted instruction and the golden tag to check whether the encrypted instruction is tampered or not comprises:

comparing the authentication tag with the golden tag for generating a comparison result by a comparator; and in response to the comparison result indicating that the authentication tag does not match the golden tag, determining that the encrypted instruction is tampered and utilizing a multiplexer (MUX) controlled by the comparator to select a no-operation (NOP) instruction stored in a register to be responded to the cache according to the comparison result.

11. The method of claim 10, wherein reading the encrypted instruction and the golden tag from the block buffer and the tag buffer respectively in order to perform the AEAD operation upon the encrypted instruction and the golden tag to check whether the encrypted instruction is tampered or not comprises:

performing a message authentication code (MAC) operation upon the encrypted instruction according to key data, for computing the authentication tag;

in response to the comparison result indicating the authentication tag matching the golden tag, transmitting a decrypted instruction to the cache, wherein the decrypted instruction is generated by decrypting the encrypted instruction according to the key data, the read address and the encrypted.

* * * * *